(12) United States Patent
Williams et al.

(10) Patent No.: US 7,562,258 B2
(45) Date of Patent: Jul. 14, 2009

(54) GENERATION OF TRACE ELEMENTS WITHIN A DATA PROCESSING APPARATUS

(75) Inventors: Michaell John Williams, Ely (GB); Edmond John Simon Ashfield, Cambridge (GB); John Michael Horley, Linton (GB)

(73) Assignee: ARM Limited, Cambridge (GB)

( * ) Notice: Subject to any disclaimer, the term of this patent is extended or adjusted under 35 U.S.C. 154(b) by 359 days.

(21) Appl. No.: 11/350,282

(22) Filed: Feb. 9, 2006

(65) Prior Publication Data
US 2007/0220362 A1   Sep. 20, 2007

(51) Int. Cl.
*G06F 11/00* (2006.01)
(52) U.S. Cl. .................... 714/45; 717/128; 712/227
(58) Field of Classification Search ............ 714/45; 717/128; 712/227
See application file for complete search history.

(56) References Cited

U.S. PATENT DOCUMENTS 5,933,626 A * 8/1999 Mahalingaiah et al. ...... 712/227
6,507,921 B1 * 1/2003 Buser et al. .................... 714/45
7,058,928 B2 * 6/2006 Wygodny et al. ............ 717/128
2004/0030962 A1   2/2004 Swaine et al.

* cited by examiner

Primary Examiner—Yolanda L Wilson
(74) Attorney, Agent, or Firm—Nixon & Vanderhye P.C.

(57) ABSTRACT

A data processing apparatus and method for generating trace elements is provided. The data processing apparatus comprises a device for performing a sequence of operations including memory operations on data values having associated data addresses. For at least some of the memory operations the data address is determined relative to an architectural state value of an item of architectural state of the device. Trace logic is provided for receiving indications of the sequence of operations being performed by the device, and for generating from the indications a stream of trace elements. When for a memory operation the data address is determined to have been determined relative to an architectural state value of the item of the architectural state, the trace logic is operable dependent on that item of architectural state to omit at least one of a data address indication and a data value indication from the stream of trace elements generated in respect of that memory operation. A trace analysing apparatus can then be provided to reconstruct such omitted information based on a tracked architectural state value of the relevant item of architectural state.

27 Claims, 7 Drawing Sheets

GENERATION OF TRACE ELEMENTS WITHIN A DATA PROCESSING APPARATUS

BACKGROUND OF THE INVENTION

1. Field of the Invention

The present invention relates to the generation of trace elements within a data processing apparatus having one or more devices whose behaviour is to be traced.

2. Description of the Prior Art

Tracing the activity of a data processing system whereby a stream of trace elements is generated including data representing the step-by-step activity within the system is a highly useful tool in system development. However, with the general move towards more deeply embedded processor cores, it becomes more difficult to track the activities of the processor core or other on-chip devices via externally accessible pins. Accordingly, as well as off-chip tracing mechanisms for capturing and analysing trace data, increased amounts of tracing functionality are being placed on-chip. An example of such on-chip tracing mechanisms is the Embedded Trace Macrocell (ETM) provided by ARM Limited, Cambridge, England, in association with various of their ARM processors.

Such tracing mechanisms produce in real-time a stream of trace elements representing activities of the data processing apparatus that are desired to be traced. This trace stream can then subsequently be analysed for a variety of purposes, for example to facilitate debugging of sequences of processing instructions being executed by the data processing apparatus, for performing profiling operations in order to determine the performance of particular program code being executed on the data processing apparatus, etc.

Typically, the stream of trace elements that is generated by the trace mechanism is buffered prior to output for subsequent analysis. Such a trace buffer is able to store a finite amount of information and requires a dedicated data bus which has a finite bandwidth over which the elements to be buffered can be received. The trace buffer is generally arranged to store information in a wrap-around manner, i.e. once the trace buffer is full, new data is typically arranged to overwrite the oldest data stored therein. It has been found that the bandwidth of the dedicated data bus limits the rate at which information can be stored in the trace buffer.

Typically, a trace analysing tool is provided which receives the stream of trace elements from the trace buffer when desired, for example once the trace has completed. The trace analysing tool can then be used to reconstruct the activities of the device being traced based on the received trace elements. As devices such as processor cores increase in power and complexity, it is clear that the amount of information required to track the activities of such devices will increase, and accordingly there will potentially be a very large volume of trace elements that need to be traced.

However, there is a problem that there is finite bus bandwidth over which the trace elements can be output by the trace logic, and any trace buffer used to buffer such trace elements will have a finite size. Accordingly, the volume of trace elements that can be generated is limited. The bandwidth issue is of particular concern to off-chip trace buffers, although it can also be a concern for on-chip trace buffers. The trace buffer size issue is particularly a concern to on-chip trace buffers, where size is at a premium.

The activities of a processor core that might want to be traced include, but are not limited to, the instructions being executed by that processor core (referred to as instruction trace), and the memory accesses made by those instructions (referred to as data trace). These activities may be individually traced or traced together, so that the data trace can be correlated with the instruction trace. The data trace itself consists of two parts, the memory addresses and the data values, referred to (respectively) as data address trace and data value trace. Again, the existing trace ETM protocols allow for data address tracing and data value tracing to be enabled independently or simultaneously.

Experience shows that for existing processor cores and ETM protocols, a bit rate of less than 2 bits per instruction is achieved for instruction tracing only. However, to illustrate the above problem, a bit rate of approximately 10 to 16 bits per instruction is achieved for instruction and data address tracing. Therefore a processor having an operating speed of approximately 1 GHz executing one instruction per cycle will generate approximately 10 to 16 Gbits/s of trace data, all of which will typically need to be captured in a fixed-size buffer, which may be off-chip. In addition to tracing instructions and data addresses, certain classes of problem also require data value tracing to be performed, and this will further increase the amount of trace data that needs to be generated to over 20 bits per instruction. Collectively, the two elements of data tracing, namely the data address tracing and the data value tracing, contribute to a large proportion of the overall volume of trace elements produced.

ARM Limited's co-pending U.S. patent application Ser. No. 10/452,904 describes a technique where a trace generation unit maintains a table used to identify architectural state derivable from previously generated trace elements, with the trace generation unit then referencing that table in order to determine which trace elements to generate during the trace generation. This can enable the number of trace elements required to be generated to be reduced, since the table provides a record of the architectural state which has already been provided to the recipient of the trace stream. Whilst such an approach provides some benefits in reducing the volume of trace elements produced, it requires the maintenance of a table within the trace logic, and can only start to reduce the amount of trace once the table has been populated to provide a history of architectural state that has already been provided by previous trace elements of the trace stream.

Accordingly, it would be desirable to provide an alternative technique for generating a stream of trace elements, which can be readily implemented whilst enabling effective use to be made of the finite bus bandwidth over which the trace elements can be output, and the finite size of any trace buffer in which those trace elements are buffered.

SUMMARY OF THE INVENTION

Viewed from a first aspect, the present invention provides a data processing apparatus comprising: a device operable to perform a sequence of operations including memory operations on data values having associated data addresses, for at least some of the memory operations the data address being determined relative to an architectural state value of an item of architectural state of the device; and trace logic operable to receive indications of the sequence of operations being performed by the device, and to generate from said indications a stream of trace elements; when for a memory operation the data address is determined to have been determined relative to an architectural state value of said item of architectural state, the trace logic being operable dependent on that item of architectural state to omit at least one of a data address indication and a data value indication from the stream of trace elements generated in respect of that memory operation.

In accordance with the present invention the trace logic is arranged to omit at least one of a data address indication and a data value indication from the generated stream of trace elements when producing trace in respect of certain types of memory operations. In particular, if for one or more particular items of architectural state, a data address of the memory operation is determined relative to an architectural state value of that item of architectural state, then the trace logic omits at least one of a data address indication and a data value indication from the stream of trace elements generated in respect of that memory operation.

The indications of the sequence of operations received by the trace logic can take a variety of forms provided those indications give sufficient information for the required stream of trace elements to be generated therefrom. Further, those indications may be transmitted from the device to the trace logic, or alternatively may be retrieved by the trace logic from the device.

Similarly, the data address indication and data value indication can take a variety of forms, so long as they give sufficient information about the data address and data value, respectively, to enable that information to be reconstructed by the relevant trace analysing tool.

The techniques of embodiments of the present invention use an assumption about the behaviour of software to reduce the amount of data that needs to be traced whilst still ultimately providing the same level of information, this behaviour of software namely being that for at least some memory operations where the data address is determined relative to an architectural state value of a particular item of architectural state of the device, the typical usage made of that particular item of architectural state by software is such that it only changes value in very predictable ways, and hence that those data addresses determined relative to that value can also be predictably determined. The stream of trace elements produced using the techniques of embodiments of the present invention can if desired undergo further compression techniques in order to further reduce the amount of data that needs to be traced, for example leading-zeros compression and unchanged-bits compression on the data value/data address, respectively, such that the data address indication and data value indication only contain part of the data address and data value, respectively. Alternatively, more aggressive compression techniques as known in the general field of data compression can be used in combination with the techniques of embodiments of the present invention.

Through use of the present invention, it has been found that the volume of trace elements that need to be generated to track the activity of the device can be significantly reduced whilst still enabling a similar amount of information about the activities of the device to be deduced by a trace analysing tool. All that is required is for that trace analysing tool to maintain a tracked value of the relevant item of architectural state which can then be used when reconstructing the omitted information. For certain items of architectural state, these tracked values are already maintained by certain trace analysing tools for other reasons.

In one embodiment, the trace logic is operable to reference an enable field associated with said item of architectural state, the enable field being settable by a user to an enable state or a disable state, and when for a memory operation the data address is determined to have been determined relative to an architectural state value of said item of architectural state, the trace logic is operable dependent on that item of architectural state and the state of the enable field to determine whether to omit at least one of the data address indication and data value indication from the stream of trace elements. Hence, through use of the enable field, a user can enable or disable the omission functionality of the trace logic. Hence, this gives a user the flexibility to disable this function, for example based on the user's additional knowledge of the behaviour of the device being traced (in the example where the device is a processor, this equating to the behaviour of the software executing on the processor), or the user's additional requirements.

In one embodiment, the trace logic has a disable flag which, on occurrence of one or more predetermined conditions, is set by the trace logic to temporarily disable omission of said at least one of the data address indication and data value indication from the stream of trace elements. Hence, through use of the disable flag, the trace logic can temporarily disable the omission functionality when one or more predetermined conditions occur. In one particular embodiment, the temporary disablement is lifted after it is effected by clearing of the disable flag, and hence as a result the setting of the disable flag causes one occurrence of the data address indication and/or data value indication determined relative to said item of architectural state to be output in the stream of trace elements prior to re-enabling of the omission functionality.

The predetermined condition used to set the disable flag can take a variety of forms. However, in one embodiment the predetermined conditions comprise at least one of: the output of a predetermined volume of trace elements; the enabling of the trace logic to generate the stream of trace elements; one or more predetermined events signalled by the device.

By setting the disable flag following the output of a predetermined volume of trace elements (typically since the last time the disable flag was set), this ensures that the nature of circular trace buffers, where once the trace buffer is full new data is typically arranged to overwrite the oldest data stored therein, can be taken into account, to ensure that at any point in time the trace buffer will include at least one traced data address indication and/or data value indication determined relative to said item of architectural state. In one embodiment, this predetermined condition can be covered reasonably reliably by detecting the elapsing of a predetermined time period rather than directly measuring the volume of trace elements produced.

By setting the disable flag on enabling of the trace logic, this ensures that an initial data address indication and/or data value indication determined relative to said item of architectural state is provided in the trace stream, since at this point the trace analysing tool will not have a valid tracked value of the relevant item of architectural state, and the trace may not remain enabled long enough for a periodic setting of the disable flag to expose it.

By setting the disable flag upon occurrence of one or more predetermined events signalled by the device, this enables the device to identify situations where even though a memory address has an associated data address determined relative to an architectural state value of some predetermined item of architectural state, the trace logic should nevertheless not omit the data address indication or data value indication from the trace stream. Considering an embodiment where the device is a processor, an example of such an event is a mode change. One of said items of architectural state might be used only by the mode in which a particular exception is processed. Mode changes only occur on exceptions, and on processing a mode change operation which typically occurs only in exception processing software. Compared to the rate of processing of instructions, exceptions are infrequent, and hence an indication relating to said item of architectural state used only in that mode might not exist in the trace buffer. Hence the disable flag for that item of architectural state might be set on that mode change.

In one embodiment, when for a memory operation the data address has been determined relative to an architectural state value of said item of architectural state, the device is operable to provide the trace logic with an indication of that item of architectural state. Alternatively, the trace logic may be arranged to determine this for itself, from tracking the instructions being executed by the device. This enables the trace logic to decide which, if any, of the associated data address indication and data value indication should be omitted from the trace stream.

The item of architectural state that may be used to trigger the omission of at least one of the data address indication and data value indication, when the data address of a memory operation is determined relative to a value of that item of architectural state, can take a variety of forms. However, in one embodiment, the item of architectural state is a program counter (PC) used by the device, and when for a memory operation the data address is determined to have been determined relative to a value of the program counter, the trace logic is operable to omit the data address indication and the data value indication from the stream of trace elements. In the majority of cases where the data address has been determined relative to a value of the program counter, it has been found that the trace analysing tool can determine the address accessed, and can also determine the data value that will be accessed, since in the majority of instances that data value will be generated by the compiler as a "literal", this being a data value inserted within the program image produced by the compiler and not changed by the program. Often, a trace analysing tool will have access to a copy of that program image, and accordingly once the data address has been determined, the data value can also be determined.

In one embodiment, the trace logic is operable to reference an enable field associated with the program counter, the enable field being settable by a user to an enable state or a disable state; and when for a memory operation the data address is determined to have been determined relative to a value of the program counter, the trace logic is operable if the enable state is set to omit the data address indication and the data value indication from the stream of trace elements, and is operable if the disable state is set to omit only the data address indication from the stream of trace elements. Hence, if the enable state is set, the data address indication and the data value indication are omitted, whereas if the disable state is set, only the data address indication is omitted. It has been found that the data address indication can still be omitted even in the disable state, since the program counter is typically tracked by the trace analysing tool, and accordingly the data address can be reconstructed even if the associated data value cannot.

In one embodiment, the item of architectural state is a stack pointer (SP) used by the device, and when for a memory operation the data address is determined to have been determined relative to a value of the stack pointer, the trace logic is operable to omit the data address indication from the stream of trace elements. For memory operations where the data address is determined relative to a stack pointer value, it has been found that the data address indication can typically be reconstructed within the trace analysing tool providing the trace analysing tool is arranged to track the value of the stack pointer. In some known trace analysing tools, such tracking of the stack pointer already occurs, and other trace analysing tools could be readily adapted to track the stack pointer.

However, whilst for certain types of load operations the data value could also be determined by a trace analysing tool if that trace analysing tool tracked the stack contents, such tracking of the full stack contents may be impractical in many situations. For example, when using circular trace buffers, the stack contents can only be tracked if they were written to the stack relatively recently. Accordingly in one embodiment the data value indication is not omitted when the data address has been determined relative to a stack pointer value.

In one embodiment, the trace logic is operable to reference an enable field associated with the stack pointer, the enable field being settable by a user to an enable state or a disable state; and when for a memory operation the data address is determined to have been determined relative to a value of the stack pointer, the trace logic is operable if the enable state is set to omit the data address indication from the stream of trace elements, and is operable if the disable state is set to include the data address indication in the stream of trace elements.

Further, in one embodiment, the trace logic has a disable flag which, on occurrence of one or more predetermined conditions, is set by the trace logic to temporarily disable omission of said data address indication from the stream of trace elements. Hence, for memory operations where the data address indication is determined relative to a stack pointer value, the disable flag can be used to temporarily disable omission of the data address indication so as to ensure that a data address indication is output in the stream of trace elements on the occurrence of one or more predetermined conditions.

In one embodiment, there are multiple stack pointers available to the device, at any point in time only one stack pointer being used by the device, the trace logic having one or more disable flags associated with the multiple stack pointers, where the number of disable flags is less than the number of stack pointers.

As an example of the above embodiment, typically different modes of operation of the device use different stack pointers, and hence when the items of architectural state that data addresses are being determined relative to are stack pointers, those items of architectural state are mutually exclusive. That is, in a given mode only one stack pointer is usable. In such embodiments, the trace logic can be arranged to share fewer disable flags (in one particular embodiment a single disable flag) between the various stack pointers, and need not worry about which stack pointer the trace analysing tool is having to track.

Whilst the above embodiment is concerned with multiple stack pointers, in a more general embodiment, for said item of architectural state, there are multiple instances of that item of architectural state available to the device, at any point in time only one instance being used by the device, the trace logic having one or more disable flags associated with the multiple instances, where the number of disable flags is less than the number of instances. These multiple instance of the item of architectural state may for example be stored in a sequence of banked registers, with each such register being associated with a different mode of operation of the device.

In one such embodiment, one of said one or more predetermined conditions used to set the disable flag is a change of mode of operation of the device. Also in one embodiment the earlier described mechanism used to set a disable flag following output of a predetermined volume of trace elements can also be merged onto fewer disable flags, since it does not matter particularly if the disable flag is set more often than strictly necessary.

The stream of trace elements may be provided directly to a trace analysing tool. However, in one embodiment the data processing apparatus further comprises a buffer operable to store the stream of trace elements for subsequent reference by a trace analysing tool.

Viewed from a second aspect, the present invention provides a trace analysing apparatus for analysing a stream of trace elements generated by a data processing apparatus in accordance with the first aspect of the present invention, the trace analysing apparatus comprising: a storage element for storing a tracked architectural state value of said item of architectural state; a trace expander operable to receive the stream of trace elements generated by the data processing apparatus and to produce a modified stream of trace elements containing at least one data address indication or data value indication omitted from the stream of trace elements by: identifying a trace element within the stream indicating a memory operation where the data address is determined relative to an architectural state value of said item of architectural state and where at least one of the associated data address indication and associated data value indication have been omitted from the stream of trace elements; and generating the at least one data address indication or data value indication omitted from the stream of trace elements with reference to the tracked architectural state value.

In accordance with this aspect of the present invention, the trace expander identifies from the stream of trace elements a memory operation where the data address has been determined relative to an architectural state value of a predetermined item of architectural state, and where at least one of the associated data address indication and associated data value indication have been omitted, and is then able to generate that omitted information with reference to the tracked architectural state value maintained in a storage element of the trace analysing apparatus. This results in a modified stream of trace elements that then can be used for analysis, for example debugging, profiling, etc.

In one embodiment, the item of architectural state is a program counter, and the tracked architectural state value is a tracked program counter value. The trace expander is operable on identifying a trace element within the stream indicating a memory operation where the data address has been determined relative to a value of the program counter: to generate a data address indication with reference to the tracked program counter value; and to include that data address indication in the modified stream of trace elements.

Further, in one embodiment, if for said memory operation the data value indication has been omitted from the stream of trace elements, the trace expander is further operable: to generate the data value indication with reference to the generated data address indication and a copy of a program image of a program specifying said sequence of operations performed by said device.

In one embodiment, the item of architectural state is a stack pointer, and the tracked architectural state value is a tracked stack pointer value. The trace expander is operable on identifying a trace element within the stream indicating a memory operation where the data address has been determined relative to a value of the stack pointer and the associated data address indication has been omitted from the stream of trace elements: to generate a data address indication with reference to the tracked stack pointer value; and to include that data address indication in the modified stream of trace elements.

Viewed from a third aspect, the present invention provides trace logic for generating a stream of trace elements from indications of a sequence of operations performed by a device, where the sequence of operations include memory operations on data values having associated data addresses, for at least some of the memory operations the data address being determined relative to an architectural state value of an item of architectural state of the device, the trace logic comprising: trace generation logic operable to generate from said indications said stream of trace elements; and control logic operable to determine when for a memory operation the data address has been determined relative to an architectural state value of said item of architectural state, and dependent on that item of architectural state to then cause the trace generation logic to omit at least one of a data address indication and a data value indication from the stream of trace elements generated in respect of that memory operation.

Viewed from a fourth aspect, the present invention provides a data processing system comprising: a device operable to perform a sequence of operations including memory operations on data values having associated data addresses, for at least some of the memory operations the data address being determined relative to an architectural state value of an item of architectural state of the device; trace logic operable to receive indications of the sequence of operations being performed by the device, and to generate from said indications a stream of trace elements, when for a memory operation the data address is determined to have been determined relative to an architectural state value of said item of architectural state, the trace logic being operable dependent on that item of architectural state to omit at least one of a data address indication and a data value indication from the stream of trace elements generated in respect of that memory operation; a storage element for storing a tracked architectural state value of said item of architectural state; a trace expander operable to receive the stream of trace elements generated by the trace logic and to produce a modified stream of trace elements containing at least one data address indication or data value indication omitted from the stream of trace elements by: identifying a trace element within the stream indicating a memory operation where the data address is determined relative to an architectural state value of said item of architectural state and where at least one of the associated data address indication and associated data value indication have been omitted from the stream of trace elements; and generating the at least one data address indication or data value indication omitted from the stream of trace elements with reference to the tracked architectural state value.

Viewed from a fifth aspect, the present invention provides a method of operating trace logic to trace activities of a device performing a sequence of operations including memory operations on data values having associated data addresses, for at least some of the memory operations the data address being determined relative to an architectural state value of an item of architectural state of the device, the method comprising: (a) receiving indications of the sequence of operations being performed by the device; and (b) generating from said indications a stream of trace elements; (c) when for a memory operation the data address is determined to have been determined relative to an architectural state value of said item of architectural state, omitting, dependent on that item of architectural state, at least one of a data address indication and a data value indication from the stream of trace elements generated at said step (b) in respect of that memory operation.

Viewed from a sixth aspect, the present invention provides a method of analysing a stream of trace elements generated by the method of the fifth aspect, comprising the steps of: (i) storing a tracked architectural state value of said item of architectural state; (ii) receiving the stream of trace elements and producing a modified stream of trace elements containing at least one data address indication or data value indication omitted from the stream of trace elements by: identifying a trace element within the stream indicating a memory operation where the data address is determined relative to an architectural state value of said item of architectural state and where at least one of the associated data address indication and associated data value indication have been omitted from the stream of trace elements; and generating the at least one data address indication or data value indication omitted from the stream of trace elements with reference to the tracked architectural state value.

Viewed from a seventh aspect, the present invention provides a method of operating a data processing system, comprising the steps of: performing within a device a sequence of operations including memory operations on data values having associated data addresses, for at least some of the memory operations the data address being determined relative to an architectural state value of an item of architectural state of the device; employing trace logic to receive indications of the sequence of operations being performed by the device, and to generate from said indications a stream of trace elements, and when for a memory operation the data address is determined to have been determined relative to an architectural state value of said item of architectural state, causing the trace logic to omit, dependent on that item of architectural state, at least one of a data address indication and a data value indication from the stream of trace elements generated in respect of that memory operation; storing a tracked architectural state value of said item of architectural state; producing from the stream of trace elements generated by the trace logic a modified stream of trace elements containing at least one data address indication or data value indication omitted from the stream of trace elements by: identifying a trace element within the stream indicating a memory operation where the data address is determined relative to an architectural state value of said item of architectural state and where at least one of the associated data address indication and associated data value indication have been omitted from the stream of trace elements; and generating the at least one data address indication or data value indication omitted from the stream of trace elements with reference to the tracked architectural state value.

Viewed from a eighth aspect, the present invention provides a computer program product comprising a computer program operable to cause a computer to analyse a stream of trace elements generated by the method of the fifth aspect by performing the steps of: (i) storing a tracked architectural state value of said item of architectural state; (ii) receiving the stream of trace elements and producing a modified stream of trace elements containing at least one data address indication or data value indication omitted from the stream of trace elements by: identifying a trace element within the stream indicating a memory operation where the data address is determined relative to an architectural state value of said item of architectural state and where at least one of the associated data address indication and associated data value indication have been omitted from the stream of trace elements; and generating the at least one data address indication or data value indication omitted from the stream of trace elements with reference to the tracked architectural state value.

Viewed from a ninth aspect, the present invention provides a data processing apparatus comprising: a device operable to perform a sequence of operations, for at least some of the operations an entity determined by those operations being determined relative to an architectural state value of an item of architectural state of the device; and trace logic operable to receive indications of the sequence of operations being performed by the device, and to generate from said indications a stream of trace elements; when for an operation said entity is determined to have been determined relative to an architectural state value of said item of architectural state, the trace logic being operable dependent on that item of architectural state to omit a corresponding entity indication from the stream of trace elements generated in respect of that operation.

The entity may take a variety of forms, for example a data address, a result of the operation, etc. In situations where an indication of that entity would normally be included in the trace stream, the technique of the above aspect of the invention enables a significant reduction in the volume of trace elements that need to be generated by avoiding the need to include such an entity indication in situations where the entity is determined relative to an architectural state value of an item of architectural state.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
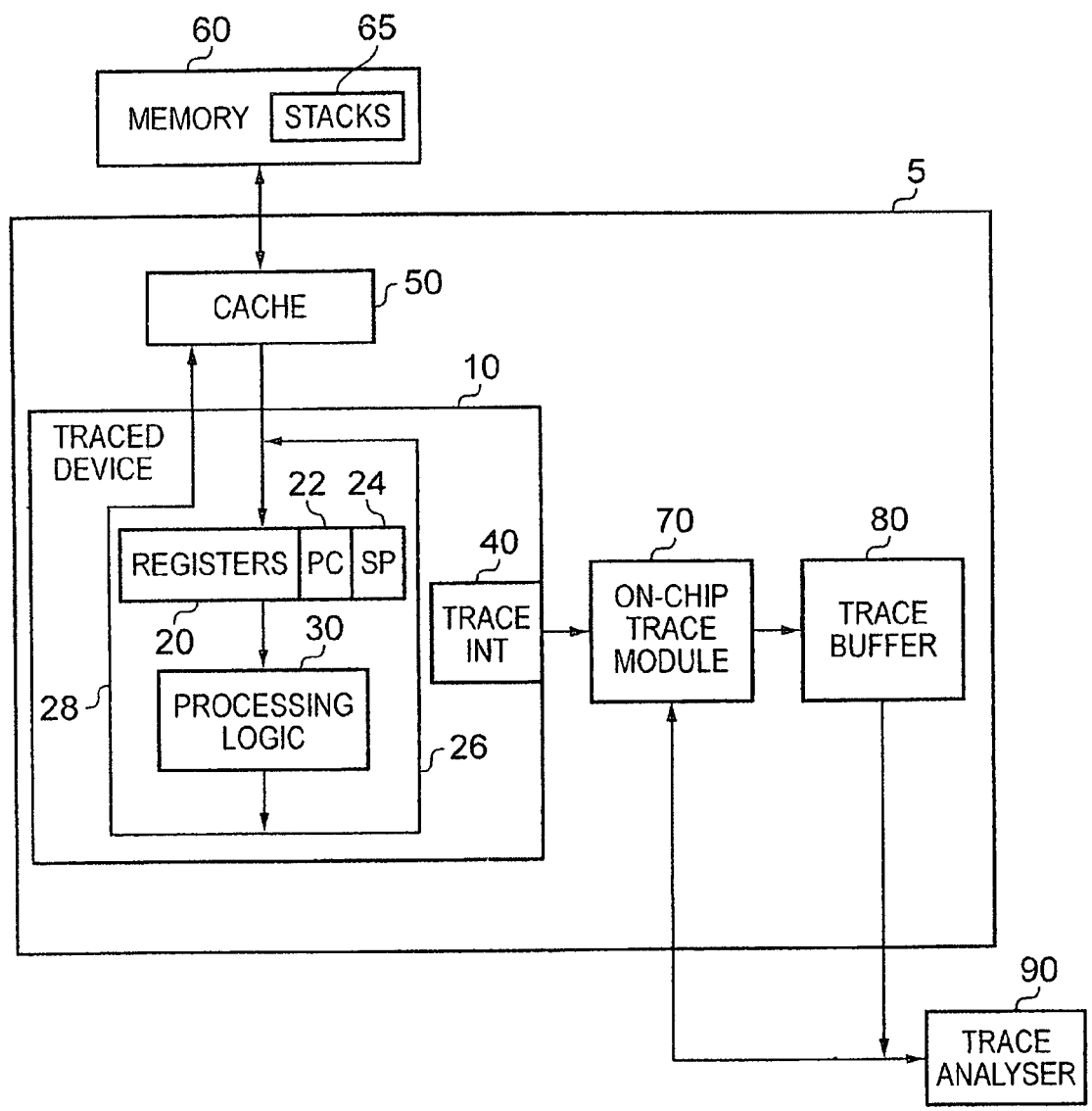
FIG. 1 is a block diagram of a data processing system in accordance with one embodiment of the present invention.

FIG. 1 schematically illustrates a data processing system providing an on-chip trace module. In particular, an integrated circuit 5 includes a traced device 10, a cache memory 50, an on-chip trace module 70 (which is a particular embodiment of the trace logic described earlier) and a trace buffer 80. Whilst in FIG. 1 the trace buffer 80 is shown as being provided on-chip, in alternative embodiments this trace buffer is provided off-chip with a bus interconnecting the trace buffer 80 with the output from the on-chip trace module 70. Further, in some embodiments, the trace module 70 may also be provided off-chip.

The traced device 10 can take a variety of forms, and may for example be a processor core, a Direct Memory Access (DMA) engine, a data engine/accelerator, etc. In FIG. 1 it is assumed that the traced device is a processor core. Within the traced device 10 is provided a register bank 20 containing a number of registers for temporarily storing data. Processing logic 30 is also provided for performing various arithmetical or logical operations on the contents of the registers. Following an operation by the processing logic 30, the result of the operation may be either recirculated into the register bank 20 via the bus 26 and/or stored in the cache 50 over the bus 28. Data can also be stored in the registers 20 from the cache 50.

The integrated circuit 5 is connected to memory 60 which is accessed when a cache miss occurs within the cache memory 50. It will be appreciated that the memory 60 may actually consist of a number of different memory devices arranged to form a number of hierarchical levels of memory, and whilst the memory 60 is shown as being provided as off-chip, one or more of these levels of memory may in fact be provided on-chip.

It will be appreciated that the presence of the cache 50 is optional and in some embodiments no cache may be present between the traced device 10 and memory 60.

A trace analyser 90, which may in one embodiment be formed by a general purpose computer running appropriate software, is coupled to the on-chip trace module 70 and the trace buffer 80. The on-chip trace module 70 is arranged to receive via a trace interface 40 of the traced device 10 information about the sequence of operations performed by the traced device, and dependent thereon produces a stream of trace elements which are stored in the trace buffer 80. The trace analyser 90 is then used to analyse that stream of trace elements in order to derive information indicative of the activities of the traced device. In particular, through analysis of the stream of trace elements, the step-by-step activity of the traced device can be determined, which is for example useful when attempting to debug sequences of processing instructions being executed by that device. The trace analysing tool is preferably provided in advance with a copy of the program image identifying the sequence of instructions being executed by the traced device, which is referred to when reconstructing the activities of that device from the stream of trace elements.

The trace analyser is connected to the on-chip trace module 70 to enable certain features of the on-chip trace module to be controlled by the user of the trace analyser. Additionally, in some embodiments, the stream of trace elements produced by the on-chip trace module may be provided directly to the trace analyser 90 rather than being buffered in the trace buffer 80.

The stream of trace elements produced by the on-chip trace module can include both instruction trace information and data trace information. The instruction trace information essentially consists of a program counter (PC) indication identifying the address of the instruction being executed, and the trace analyser 90 can then identify the actual instruction with reference to the copy of the program image that it has access to. The data trace information may comprise data address indications and data value indications, the data address indication being used to derive the address in memory of the data value concerned, and the data value indication being used to derive the actual data value at that address. Typically, the data tracing information occupies a very significant portion of the volume of trace data generated by the on-chip trace module, when compared with the instruction tracing information. In any particular implementation, there will be a finite bandwidth available for outputting the stream of trace elements from the on-chip trace module, and also the trace buffer will be of a finite size. The size of the trace buffer is likely to become a particularly limiting factor when the trace buffer is provided on-chip, whilst similarly if the trace buffer is provided off-chip, or the stream of trace elements is provided directly to the trace analyser, then the bandwidth available for routing the stream of trace elements off-chip is likely to become a limiting factor. Given these issues, it is desirable to try and reduce the amount of information that needs to be included within the stream of trace elements whilst still providing sufficient information to enable the trace analyser to perform the necessary analysis.

The inventors of the present invention realised that certain classes of memory operations, i.e. load and store operations, use a data address that can-be derived by the trace analyser without the corresponding data address indication needing to be traced, provided that some additional logic is provided within the trace analyser. In one particular implementation, it was found that the following types of load and store operations fall into the above category:

1. Load instructions with an address relative to the program counter (PC). In principle, store instructions with an address relative to the PC would also fall into this category, but in practice such store instructions often do not occur. For the majority of cases where the load instruction specifies an address relative to the PC, the trace analyser can determine the address accessed, and can also determine the data value that will be loaded, since typically those data values are generated by the compiler and inserted into the program image as "literals" which are not modified by the program, and hence the trace analyser can identify those literals from its copy of the program image.
2. Store instructions relative to the stack pointer (SP). In the majority of these cases, the trace analyser can determine the address accessed by tracking the SP in the trace analyser.
3. Load instructions relative to the SP. In the majority of these cases, the trace analyser can determine the address accessed, again by tracking the SP. In many cases the data value could be determined by a trace analyser that tracked the stack contents. However, in many embodiments, it may be impractical to track the fill stack contents and so in such implementations it is envisaged that the data value itself would still be traced.

The PC value being used by the trace device 10 may be stored within one of the registers 22 of the register bank 20, and similarly any SP value used to reference stacks 65 maintained in the memory 60 may also be stored within one or more registers 24 of the register bank 20; this is the arrangement shown in the embodiment of FIG. 1. Alternatively one or both of the PC and SP values may be stored elsewhere for access by the traced device. In embodiments where the software executing on the traced device 10 may operate in a plurality of modes of operation, for example user mode, privileged mode, etc, it is common to provide separate stacks for each mode of operation, with each stack having an associated SP. As will be appreciated by those skilled in the art, stacks are used to hold program variables and other variables used when performing a sequence of operations on the device 10.

Given the above observations, the inventors of the present application realised that that for program code generated by typical compilers, if the PC and SP values being used by the traced device 10 are tracked by the trace analyser 90, then this will avoid in most situations the need to issue data address indications and in some instances data value indications in the stream of trace elements produced in respect of the above types of load and store operations. However, there are still a few cases where the trace analyser tool will not be able to determine the data address, in particular where the address computation involves reference to a second register (i.e. a register in addition to the register containing the PC value or the SP value), or for SP relative load operations, where the SP has recently been changed by an instruction that defeats the SP tracking mechanism within the trace analyser 90.

However, the majority of operations that change the SP are amenable to being tracked within the trace analyser 90. In one embodiment, these operations are as follows:

1. Push and pop operations, where the amount by which the SP changes is implicit in the instructions.
2. Add operations for removing items off a stack without reading them. In these cases, the amount added is a fixed constant, so can be tracked by the trace analyser as it analyses the stream of trace elements.
3. Subtract operations for reserving space on the stack without writing to it. As with the add operation case, the amount subtracted is a fixed constant.

With reference to points 2 and 3 above, in some situations add and subtract operations may be permitted where the amount added or subtracted is not a fixed constant, but the inventors of the present invention noted that these operations are not used in program code generated by typical compilers.

It should be noted that the above discussion of add and subtract operations relates to a descending stack, and it will be appreciated that for an ascending stack, the add and subtract operations are used for the opposite functions.

It is in the nature of the SP that other operations to manipulate it are rare in code generated by typical compilers. However most operations are legal, and may appear in a program. Examples of such operations are:

1. A data processing operation (move, add, subtract, etc) with the SP as the target register but some other register as a source. Such operations may be used to initialise the SP, or to expand/shrink the stack using some other register as an intermediate in the calculation.
2. A load operation, with the SP as the target register. This may be used to initialise the SP.
3. In some embodiments, multiple stack pointers may be available to the device, for example a different stack pointer for each mode of operation of the device. Only one stack pointer will be used at a time, but mode changes can in such embodiments cause the stack pointer to be switched. However, such mode changes are comparatively rare.

Additionally, the trace buffer used to store the stream of trace elements for analysis by the trace analyser is often in the form of a circular buffer, with older trace elements being overwritten by newer trace elements. In such situations, it is possible that the trace analyser may not have sufficient information to reconstruct the SP.

With the above observations in mind, the inventors of the present invention have provided some additional control functionality within the on-chip trace module 70 to allow it to selectively not trace data address indications and/or data value indications, and have provided a mechanism within the trace analysing logic 90 to allow such omitted information to be reconstituted in many instances.

Figure 2:
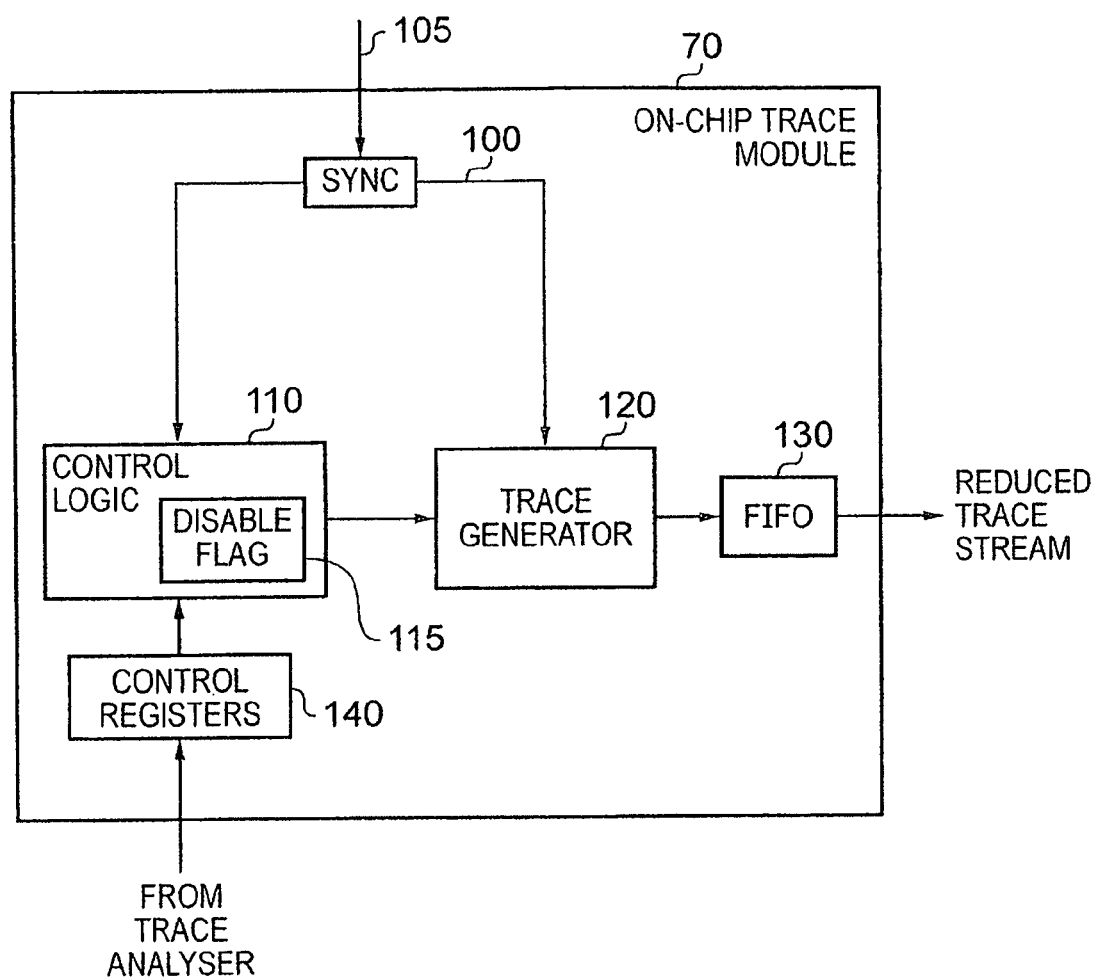
FIG. 2 is a block diagram illustrating in more detail the on-chip trace module of FIG. 1 in accordance with one embodiment.

FIG. 2 is a block diagram of the on-chip trace module 70 in accordance with one embodiment. The on-chip trace module 70 is arranged to receive over path 105 data indicative of the processing being performed by the traced device 10, this being received via the trace interface 40 of the traced device 10. The sync logic 100 is arranged to convert the incoming signals into internal versions of the signals more appropriate for use within the on-chip trace module 70. These internal versions are then sent to the control logic 110 and the trace generation logic 120, although it will be appreciated that the control logic 110 and the trace generation logic 120 will not necessarily need to receive the same signals. Fundamentally, the control logic 110 needs to receive data relating to triggerable events, for example instruction addresses, data values, register accesses, etc so that it can determine whether trace should be activated, and what types of data elements should be traced. It then issues appropriate control signals to the trace generation logic 120 to cause the required trace elements to be generated by the trace generation logic 120. The trace generation logic 120 receives via the sync logic 100 any data that would need to be traced dependent on the control signals issued by the control logic 110.

In accordance with embodiments of the present invention, control registers 140 are provided which are used to configure the operation of the control logic 110, these control registers 140 being settable from the trace analyser 90. A number of control registers can be provided, but of particular interest to embodiments of the present invention are one or more enable registers indicating whether the omission functionality described earlier, where in certain situations at least one of a data address indication and data value indication are omitted from the stream of trace elements, is to be enabled or disabled.

In one embodiment of the present invention, such omission functionality is performed in respect of load or store operations where the data address is determined relative to a value of certain items of architectural state, in particular in one embodiment these items of architectural state being the SP or the PC. For each such item of architectural state where the omission functionality may be employed, a corresponding enable register is provided within the control registers 140 to enable that functionality to be enabled or disabled by a user of the trace analyser 90. This hence enables a user to disable the function, for example based on the user's additional knowledge of the behaviour of the traced device 10 or the user's additional requirements. In a simplified embodiment, a reduced number of enable registers may be provided such that there are less enable registers than items of architectural state where the omission functionality may be employed, since it may be considered unnecessary to be able to enable and disable the omission functionality for each item of architectural state independently.

In one embodiment, the control logic 110 is also provided with an internal disable flag 115 which can be set by the control logic on occurrence of one or more predetermined conditions in order to temporarily disable omission of a data address indication or a data value indication from the stream of trace elements. In one embodiment, this temporary disablement is lifted after it is effected, so as to allow one occurrence of the data address indication or data value indication to be traced before re-enabling the omission function. In one embodiment, this internal disable flag is set periodically, which ensures that when the earlier-mentioned circular trace buffers are used, there will always be sufficient information to reconstruct the SP from the stream of trace elements. Additionally, in one embodiment, this disable flag is set on enabling of trace, since at this point the trace analyser tool will not know the current value of the relevant item of architectural state, and trace may not remain enabled long enough for a periodic disablement as discussed above to expose it. Further, in one embodiment, the disable flag can be set on the occurrence of one or more specific events signalled by the traced device. This for example may be useful where a mode change or some other event occurs within the traced device which will mean that the trace analyser 90 will have insufficient information to reconstruct the activity of the traced device unless the data address indication and/or data value indication are also traced.

More details as to how the enable fields in the control registers 140 and the disable flag 115 are used by the control logic 110 in deciding what data elements should be traced will be discussed in more detail later with reference to the flow diagram of FIG. 4.

Dependent on the control signals issued by the control logic 110, the trace generation logic 120 reacts accordingly by outputting the necessary trace elements to the FIFO 130. From here, the trace stream is then output to the trace buffer 80, or in alternative embodiments is output directly to the trace analyser 90.

Figure 3:
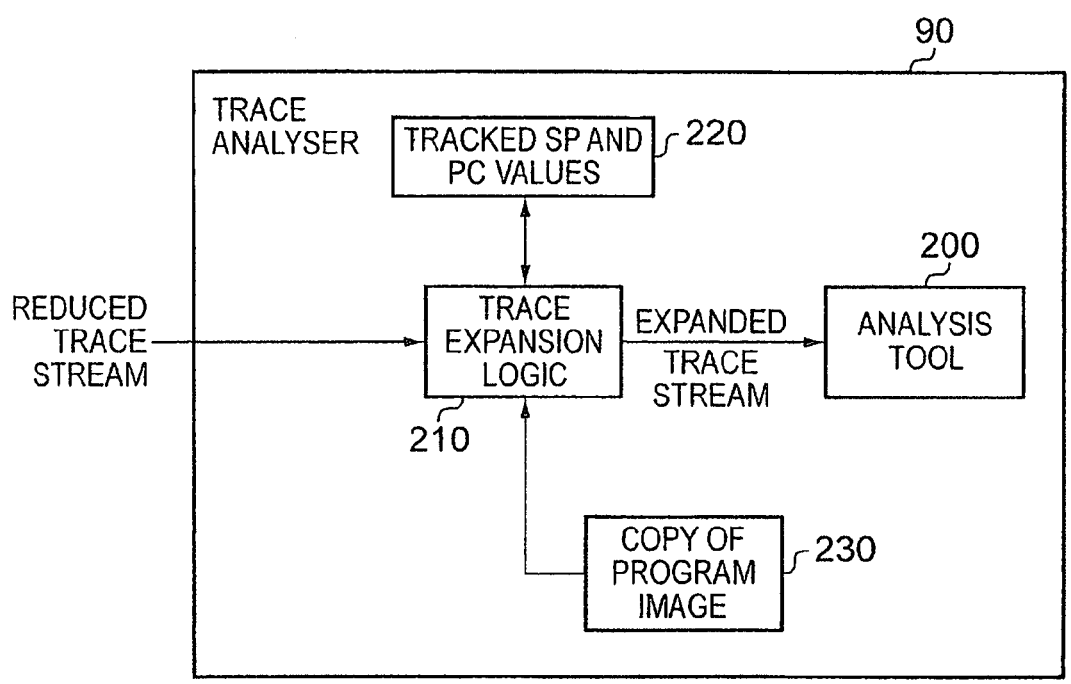
FIG. 3 is a block diagram illustrating in more detail the trace analyser of FIG. 1 in accordance with one embodiment.

FIG. 3 is a block diagram illustrating in more detail the operation of the trace analyser 90 in accordance with one embodiment of the present invention. The trace stream output by the on-chip trace module 70 is received by the trace expansion logic 210, this input trace stream being a reduced trace stream in that data address indications and/or data value indications will have selectively been omitted for the certain types of memory operations discussed earlier. The trace expansion logic 210 is arranged to seek to insert the omitted trace elements, whether they be data address indications or data value indications, into the trace stream in order to output an expanded trace stream for forwarding onto the analysis tool 200. Further, the trace expansion logic will typically be arranged to perform certain decompression functions, to remove any compression applied by the trace logic when generating the trace stream. As an example, this may involve converting a value in a compressed form indicated on a data bus in the input trace stream into a form usable by the analysis tool, usually a complete value in program memory. Hence, the indications in the expanded trace stream may have a different form to the indications in the original trace stream generated by the trace logic.

The trace expansion logic 210 and analysis tool 200 will typically be formed by software executing on the trace analyser 90, although alternatively a hardware solution may be employed.

To assist the trace expansion logic 210 in performing this function, a copy of the program image 230 is provided within the trace analyser 90. The trace stream will typically include a sequence of PC values identifying particular instructions being executed on the traced device 10, and the trace expansion logic 210 can reference the copy of the program image 230 in order to identify the actual instruction existing at any particular PC value. Further, the PC values appearing in the instruction trace are routed to the tracking registers 220, where a tracked version of the latest PC value is maintained.

As will be discussed in more detail later with reference to FIGS. 5 to 8, the trace expansion logic 210 can also seek to track the SP value from the stream of trace elements received from the on-chip trace module, and will store any such derived SP value as a tracked SP value within the registers 220. In one embodiment, the tracked PC value can be guaranteed to be correct, because it is provided directly in the trace stream. However, in the embodiment described herein, it may be that at certain points the tracked SP value is determined to be incorrect. Accordingly, in one embodiment, in association with the tracked SP value, a valid flag is also provided within the registers 220 which can be set when the SP value is updated, and can be reset when the trace expansion logic 210 determines that the tracked SP value is no longer correct. Again, these functions will be described in more detail with reference to the flow diagrams of FIGS. 5 to 8.

When a load or store operation is detected within the received trace stream by the trace expansion logic 210, and that load or store operation is of a type where the data address has been determined relative to an SP or a PC value, and at least one of the data address indication and data value indication associated therewith have been omitted from the stream, the trace expansion logic seeks to regenerate that omitted information with reference to the tracked SP or PC value, as appropriate. Any regenerated data address indication and/or data value indication is then inserted into the trace stream as additional trace elements and output within the expanded trace stream forwarded to the analysis tool 200, the trace analysis tool then performing any one of a number of known trace analysis functions using the expanded trace stream as its input, for example debugging functions.

Figure 4:
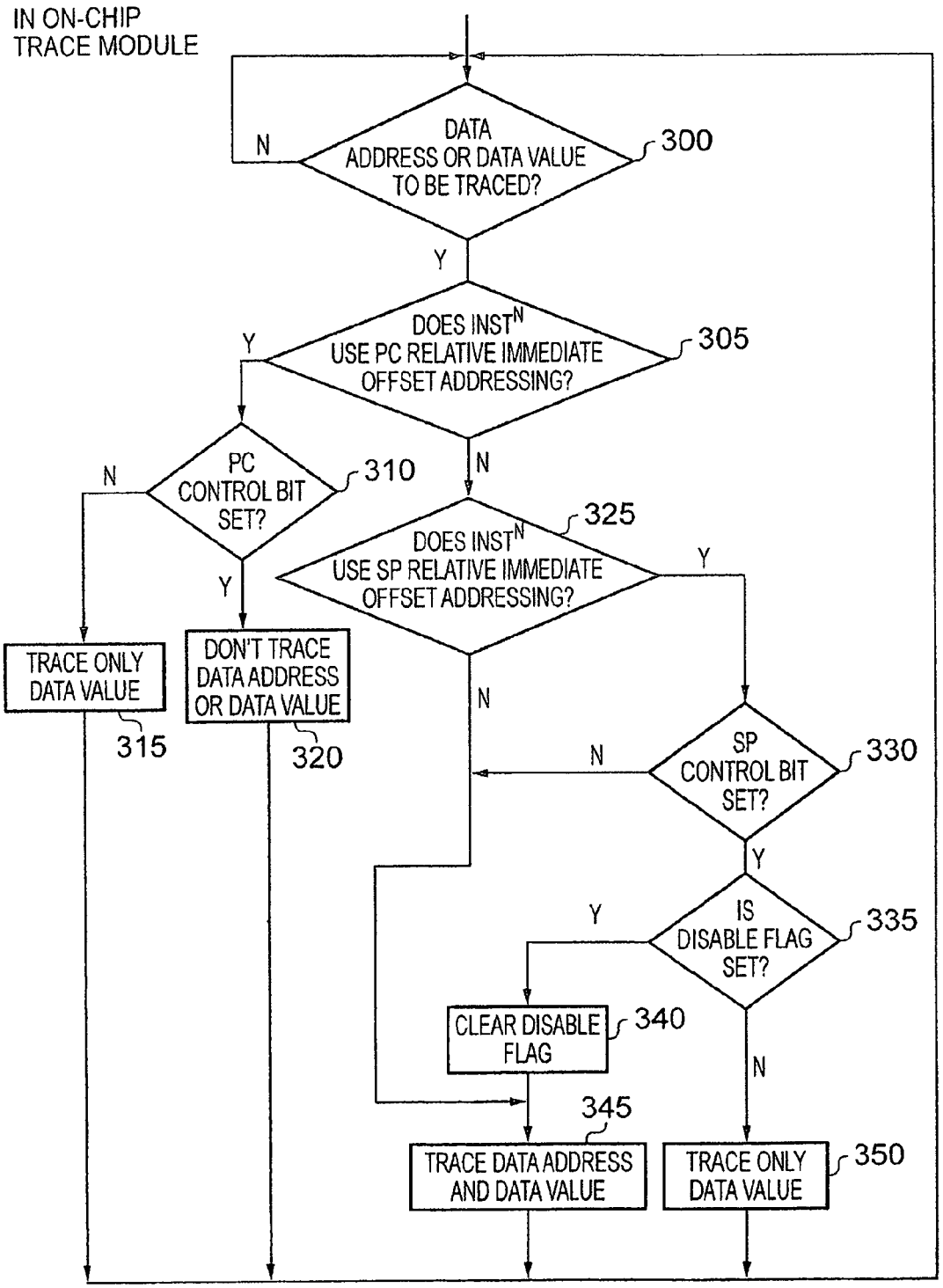
FIG. 4 is a flow diagram illustrating a sequence of steps performed within the on-chip trace module of FIG. 1 in accordance with one embodiment.

FIG. 4 is a flow diagram illustrating how the control logic 110 of the on-chip trace module 70 uses the enable registers and disable flag when deciding whether data address indications and/or data value indications should be traced in respect of particular memory operations. At step 300, it is determined whether a data address or a data value is provided for tracing. If it is, then at step 305 it is determined whether the associated instruction uses PC relative immediate offset addressing. Such an addressing scheme is where the address is determined by adding or subtracting an immediate value (i.e. a value specified by the instruction itself) to or from the current PC value.

If the instruction is determined to be a PC relative immediate offset addressing type of instruction, then the process proceeds to step 310, where it is determined whether the PC control bit is set within the PC enable register of the control registers 140. If it is set, then at step 320 it is determined by the control logic that neither the data address indication or the data value indication are to be traced. However, if the control bit is not set, then at step 315 it is decided by the control logic that only the data value indication needs to be traced. In both instances, the data address indication does not need to be traced, since that can be directly regenerated from the tracked PC value.

Returning to step 305, if it is determined that the instruction does not use PC relative immediate offset addressing, it is then determined at step 325 whether the instruction uses SP relative immediate offset addressing. If so, then at step 330 it is determined whether the SP control bit is set within the SP enable register 140. If so, it is then further determined at step 335 whether the disable flag 115 is set within the control logic. If it is set, then the process proceeds to step 340 where the disable flag is cleared, whereafter at step 345 both the data address indication and the data value indication are traced. Similarly, if at step 325 it was determined that the instruction did not use SP relative immediate offset addressing, or if at step 330 it was determined that the SP control bit was not set, then again the process proceeds to step 345 where the data address indication and data value indication are traced. However, if at step 335 it is determined that the disable flag is not set, then at step 350 the control logic determines that the data address indication can be omitted, and that only the data value indication needs to be traced.

In FIG. 4 it is assumed that there is only a single SP in the traced device and hence only a single disable flag provided. In some embodiments, it is likely that the traced device will have a plurality of modes of operation, and each mode may have an SP associated therewith. It is possible in such instances to replicate the disable flag for each SP. The SP control bit can also be replicated for each SP if it is desired to allow the omission functionality to be enabled and disabled for different SPs independently, but typically a single SP control bit will suffice.

If the disable flags are replicated for each SP, the evaluation made at step 325 would be an evaluation as to whether the instruction uses SP relative immediate offset addressing with respect to the current SP (i.e. the SP used by a current mode of operation). The trace module would additionally be provided with an indication of the current mode of operation or an indication of mode changes. The trace module can then track the current mode and hence determine which is the current stack pointer and hence which disable flag is to be referenced at step 335.

However, in one embodiment, even where multiple stack pointers are used, a single disable flag is employed. With such an approach an issue that may arise is that there are periods— in between exceptions for exception stack pointers and during exception processing for the user stack pointer—when a particular stack pointer will not be used. If a temporary disable flag per stack pointer is used this is not an issue, since during those periods you might expect the periodic setting of the relevant flag to occur, so there is no need to treat exceptions specially.

However, when using a single disable flag one of the conditions used in one embodiment to set the disable flag is a change of mode of operation of the device. When using a single disable flag shared between the various SPs, if the flag is set on a mode change, this mimics having multiple flags with the assumption that given a mode change has occurred the other flag must surely have timed out (been set under a periodic timer) since it was last used. This might be a false thing to presume, but it is a safe assumption. Hence, the setting of the single disable flag on mode changes has been found to provide a means to simulate many disable flags, one per SP register, in the case where the SP registers are banked, that is, they are never concurrently active.

It will be appreciated that FIG. 4 does not illustrate all of the processing performed by the control logic. For example, as mentioned earlier, the control registers 140 will typically include other pieces of control information in addition to the PC control and SP control bits. As an example, separate control bits may be provided to identify whether data address tracing and/or data value tracing is enabled. In FIG. 4 it is assumed that both data address tracing and data value tracing are enabled, since otherwise the process illustrated in FIG. 4 would be unnecessary until such time as either data address tracing or data value tracing were enabled.

Figure 5:
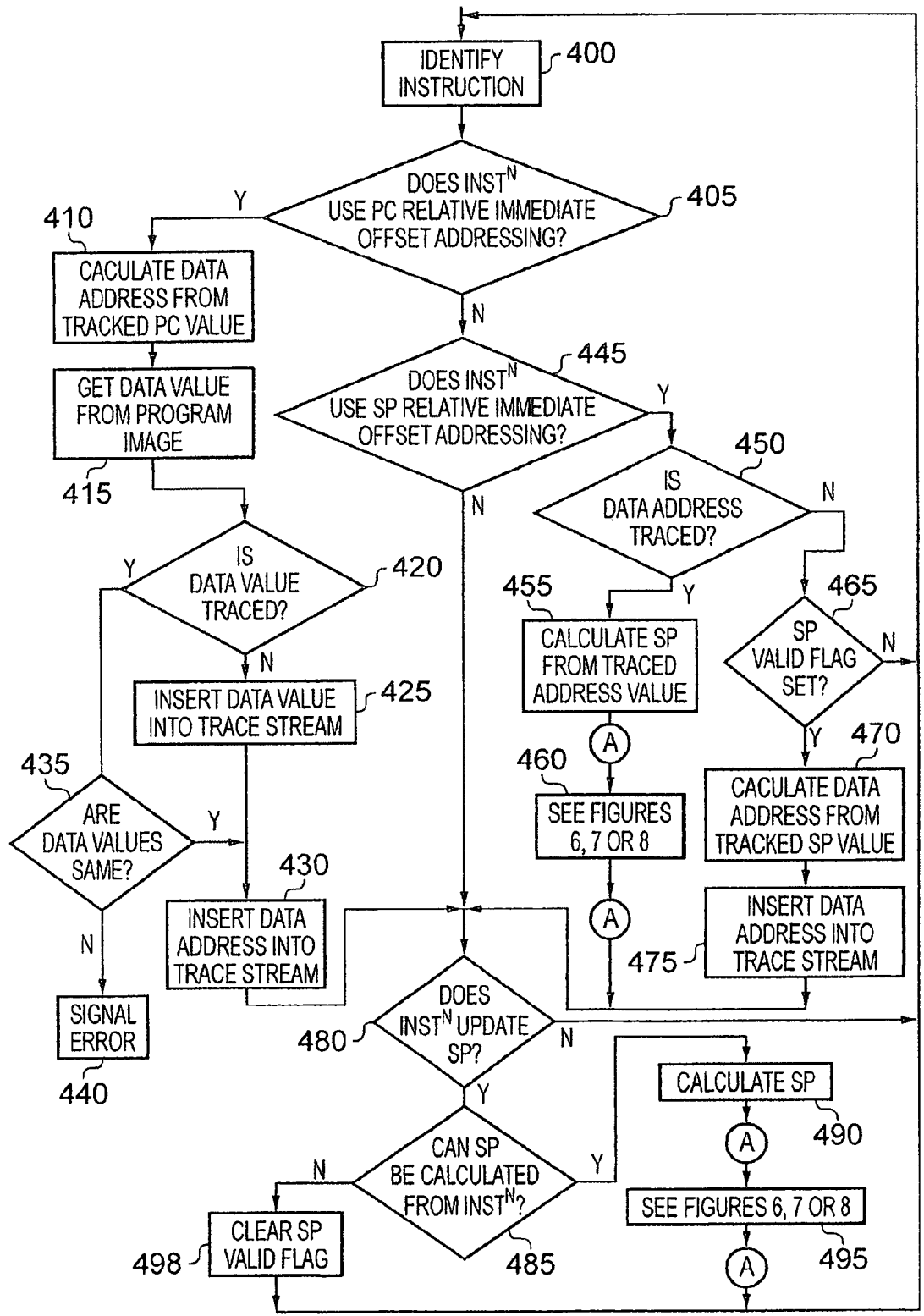
FIGS. 5 to 8 are flow diagrams illustrating a sequence of steps performed within the trace analyser of FIG. 1 in accordance with various embodiments of the present invention.

FIG. 5 illustrates a process performed within the trace analyser 90 of FIG. 1 in accordance with one embodiment, and in particular illustrates a process performed by the trace expansion logic 210 of FIG. 3. At step 400, an instruction is identified from the received trace stream, whereafter at step 405 it is determined whether that instruction uses PC relative immediate offset addressing. If so, then at step 410 the data address indication is calculated with reference to the tracked PC value held within the registers 220. Thereafter, at step 415 the associated data value indication is obtained from the program image 230. At step 420, it is then determined whether the data value has also been traced. If so, this enables some error checking to be performed at step 435, in order to determine whether the traced data value is the same as the data value obtained at step 415. If not, then an error is signalled at step 440. If however the data values are the same, no action is needed, and instead the process branches to step 430 where the data address is inserted into the trace stream. Assuming the data value was not traced at step 420, then the data value calculated at step 415 will be inserted into the trace stream at step 425 and the data address will be inserted into the trace stream at step 430.

Returning to step 405, if the instruction is determined not to use PC relative immediate offset addressing, then it is determined at step 445 if that instruction uses SP relative immediate offset addressing. If so, it is then determined at step 450 whether the associated data address indication has been traced. If not, it is then determined at step 465 whether the SP valid flag associated with the tracked SP value in the registers; 220 is set. If not, then it will not be possible for the trace expansion logic 210 to regenerate the omitted data address indication, and instead the process merely returns to step 400. However, assuming the SP valid flag is set, then at step 470 the data address indication is calculated from the tracked SP value, whereafter that data address indication is inserted into the trace stream at step 475.

If at step 450 it is determined that the data address indication was traced, then at step 455, an SP value is calculated from the traced address value. Thereafter, at step 460 a number of different optional steps can be taken as will be discussed later with reference to FIGS. 6 to 8, these steps being used to update the tracked SP value, and optionally additionally perform some further analysing steps based on the newly calculated SP value.

The process then proceeds to step 480, and indeed as illustrated in FIG. 5 step 480 is also reached following steps 430 or 475, or if at step 445 it is determined that the instruction does not use SP relative immediate offset addressing. At step 480 it is determined whether the instruction updates the SP value. If it does not, then no further action is needed and the process returns to step 400. However, assuming the instruction does update the SP value, then at step 485 it is determined whether the SP value can be calculated from the instruction as traced. If not, then a new SP value cannot be generated, but it is known the tracked SP value is no longer valid, and accordingly at step 498 the SP valid flag associated with the tracked SP value in registers 220 is cleared.

However, assuming the SP value can be calculated from the instruction, then at step 490 that new SP value is calculated, whereafter one or more optional processing steps are performed at step 495, as will be discussed in more detail with reference to FIGS. 6 to 8.

Figure 6:
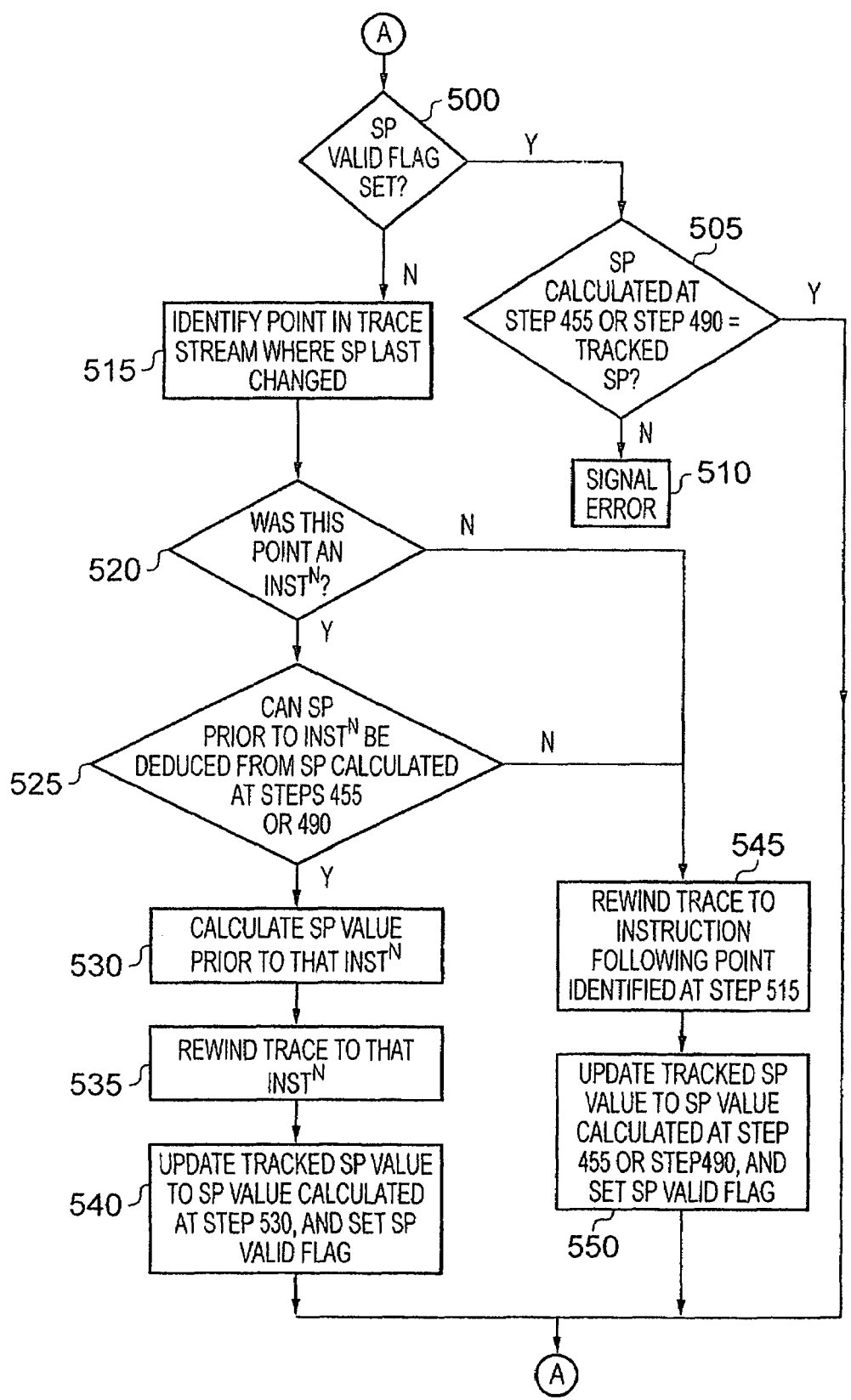
Figure 7:
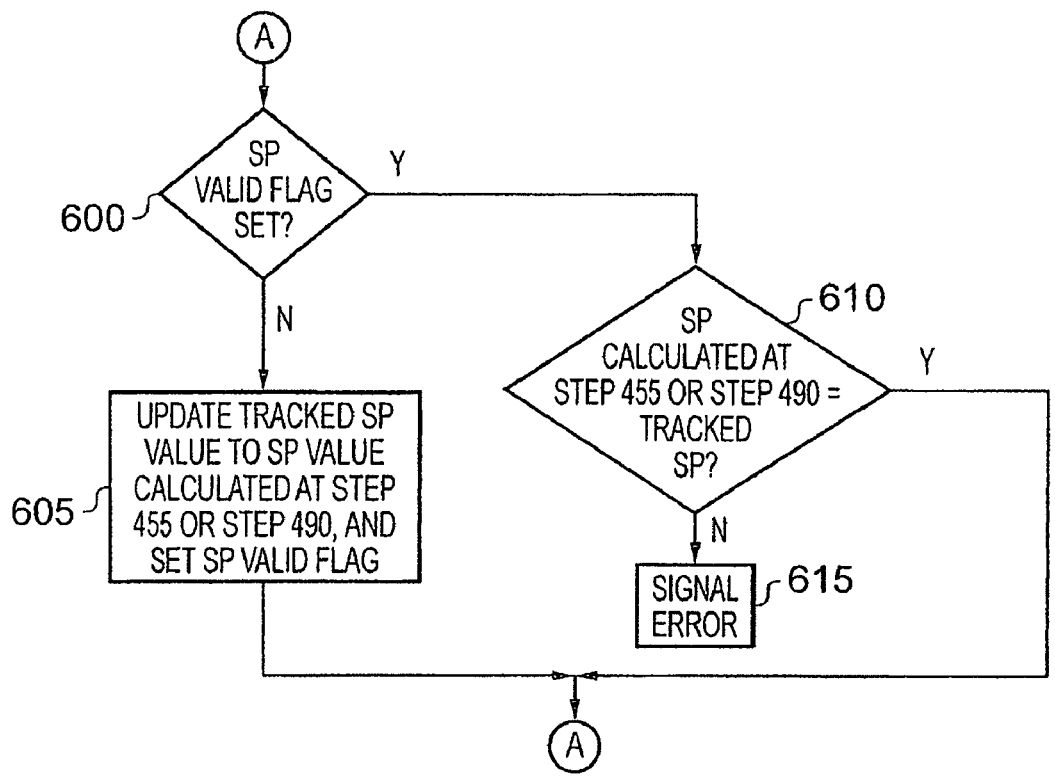
Figure 8:
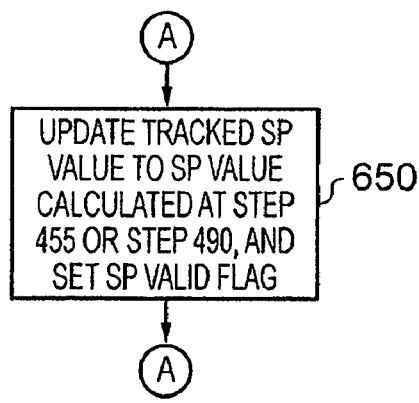

FIGS. 6, 7 and 8 illustrate alternative sequences of operations that could be performed at steps 460 or 495 in FIG. 5. FIG. 6 illustrates the most comprehensive sequence of steps that can be taken, where in addition to updating the tracked SP value, additional processing steps are performed to work back through the traced stream to identify whether any additional trace elements can now be generated given the calculated SP value. Considering FIG. 6 in more detail, at step 500 it is determined whether the SP valid flag is set. If it is, then at step 505 some error checking is performed to check whether the SP value calculated at either step 455 or step 490 (depending at which point in FIG. 5 the flow diagram of FIG. 6 is entered) is equal to the tracked SP value. If not, then an error is signalled at step 510, whereas otherwise no action is needed, and the processing returns to that illustrated at the relevant point in FIG. 5.

Assuming the SP valid flag is not set, then at step 515 the trace expansion logic 210 works back through the trace stream in order to identify a point in that trace stream where the SP was last changed or was otherwise marked as unknown (e.g. at the start of trace). As discussed previously, there are a number of actions that can take place in order to change the SP. At step 520 it is determined whether the action taking place at that point in the trace stream in order to change the SP was the execution of an instruction. If not, then the process branches to step 545, where the trace is rewound to the instruction following the point identified at step 515. Thereafter, at step 550, the tracked SP value is updated to the SP value calculated at step 455 or step 490, and the SP valid flag is set. Thereafter, the processing returns to the relevant point in FIG. 5. As a result of this, it can be seen that all of the intervening trace elements between the instruction identified at step 545 and the instruction that had caused the SP value to be calculated at either step 455 or 495 in FIG. 5 are re-analysed by the trace expansion logic 210. This is useful, since given that an invalid SP value has now been replaced by a valid value, it may be possible for the trace expansion logic 210 to insert further trace elements in to the trace stream.

If at step 520 it is determined that the point at which the SP value was last changed was indeed due to execution of an instruction, then at step 525 it is determined whether the SP value prior to that instruction can be deduced from the SP value calculated at steps 455 or 490. If not, then the process branches to step 545 which has been discussed earlier. However, assuming it can, then at step 530 the SP value prior to that instruction is calculated. Thereafter, the trace is rewound to the instruction identified at step 520, whereafter at step 540 the tracked SP value is updated to the SP value calculated at step 530, and the SP valid flag is set. Again, by such a process, a portion of the trace stream can be re-analysed by the trace expansion logic 210 with the aim of seeking to generate further trace elements to include in the expanded trace stream routed to the analyser tool 200. It will be appreciated that the process shown in FIG. 6 can be extended such that steps 515 to 540 are executed recursively in order to determine as many missing SP values as possible.

FIG. 7 is a flow diagram illustrating an alternative sequence of operations which can be used in place of that discussed earlier with reference to FIG. 6, where such rewinding of the trace stream is not required. At step 600, it is determined whether the SP valid flag is set and if so the process proceeds to step 610, where the same error checking process as discussed earlier with reference to step 505 of FIG. 6 is performed, resulting in either an error being signalled at step 615, or no further action being necessary. However, if the SP valid flag is not set, then at step 605 the tracked SP value is updated to the SP value calculated at step 455 or 490, and the SP valid flag is set.

FIG. 8 illustrates a third alternative sequence, where the error checking process illustrated in FIG. 7 is not deemed necessary. In this embodiment, the only step taken is to update the tracked SP value to the SP value calculated at step 455 or step 490, along with the setting of the SP valid flag.

One particular embodiment of the on-chip trace module 70 and trace analyser 90 has been described above with reference to FIGS. 1 to 8. Another way of viewing an embodiment of the on-chip trace module 70 and the trace analyser 90 is discussed below.

In accordance with the following described embodiment of the invention:

1. The traced device signals to the tracer device (also referred to herein as the trace logic) the identity of the portion of the traced device's state (referred to hereafter as the device register, otherwise known as the item of architectural state) that was/is used to generate a value that is to be traced.
2. The tracer device determines whether the value is to be traced, based on the identity of device register that generated it.

In addition, the tracer device may also:

1. Include state that allows a user of the tracer device to disable this function, for example based on the user's additional knowledge of the behaviour of the traced device or the user's additional requirements.
2. Include an internal disable flag that temporarily disables this function. The temporary disablement is lifted after it is effected (that is, it allows one occurrence of the value to be traced before re-enabling the function). This internal disable flag may be set:
   a. periodically, to deal with the nature of circular trace buffers;
   b. on enabling of trace; at this point the trace analyser cannot know the current value of the device register, and trace may not remain enabled long enough for a periodic disablement (a) to expose it
   c. (optionally) at other specific events signalled by the traced device.

In order to reconstruct the missing values that were generated from a device register, the trace analyser is arranged:

1. to hold a tracked register value and a valid flag for each device register of the traced device that can be used in the way described.
2. on encountering an operation of the traced device that operates on the device register:
   a. If a value dependent on the device register is specified in the input trace stream, then:
      i. if possible to deduce, by reversing the operation that generated it, a calculated register value
      ii. (Optionally) If the valid flag is set, to compare the tracked register value with the calculated register value and report an error in the output trace stream if they differ, and if possible, invalidate all reported speculative values since the last point in the output trace stream where the tracked register value was known to be absolutely correct (for example, the last point it appeared in the trace stream).
      iii. Assign the calculated register value to the tracked register value and set the valid flag.
      iv. (Optionally) see below
   b. Otherwise, if the valid flag is set, and if possible, calculate the value that would have been traced and insert it into the output trace stream, (optionally) marking it as speculative.
   c. Otherwise, report to the user that the value is unknown.
3. on encountering operation that updates the device register, or a conditional form of such an operation that is known to have been executed:
   a. if the output of the operation is entirely deterministic based on the operation itself and the previous device register value (or other previous device state being similarly tracked), and if the valid flag is set, mimic the operation to update the tracked register value.
   b. otherwise clear the valid flag.
4. on encountering discontinuities in the trace, at the start of the trace buffer, and other specific events specified by the input trace protocol, clear the valid flag.

(2.a.iv) If the valid flag was not set prior to this operation, the trace analyser can now re-examine the trace:

a. Locate the most recent point in the trace where the traced device executed an operation that changed the device register, or a discontinuity or other specific event, whichever is the most recent.
b. Use the computed value of the tracked register value to compute missing values in the trace from that point onwards to the point where the calculated register value was generated by (2.a), and insert these values into the output trace.
c. In the case of a discontinuity or other specific event, stop this sub-process.
d. Otherwise, if possible, reverse the operation to compute the tracked register value prior to this operation, and repeat this sub-process.

Two particular embodiments of the above technique are as follows.

For a PC-relative example where the traced device is a processor core, the tracer device is ETM logic, and the device register is a PC register, the hardware consists of:

1. A signal from the processor core to the ETM logic signals that the register used as the base of a load operation is the program counter.
2. When the ETM logic receives notification by signal (1) that a load operation is PC-relative, the ETM suppresses the generation of data address tracing.
3. A control bit in the ETM logic enables filtering of program counter relative values. Normally the user can set this bit given that PC-relative loads will typically be of literals stored in the image; however, where they are known not to be, the user can clear this control bit.
4. Further to (2) if the control bit in (3) is set at the receipt of signal (1), the ETM also suppresses data value tracing.

The trace analyser in such an embodiment consists of:

The tracked register value is the program counter, which is already tracked by the trace analyser. In this case, the trace analyser cannot determine the operations performed by the processor if this value is not valid, and hence there is no requirement for the valid flag which can be assumed to be always set, and steps (2.a.*) can be omitted. For this reason, the hardware also does not need to include the internal disable flag.

The values omitted from the trace that are recreated by step (2.b) are literals loaded by the program. These are usually loaded by instructions of the form LDR Rd,[PC, #imm]—given the tracked register value of the PC, and the known immediate, the address of the loaded literal can be computed. Since the trace analyser has access to the image being traced, it can insert this literal into the output trace stream.

The operations that update the program counter (step (3)) are tracked by the trace analyser in the manner described.

For an SP-relative example where the traced device is a processor core, the tracer device is ETM logic, and the device register is an SP register, the hardware consists of:
1. A signal from the processor core to the ETM logic signals that the register used as the base of a load and/or store operation is the stack pointer.
2. A control bit in the ETM logic enables filtering of stack-pointer relative values.
3. An internal disable flag in the ETM logic that is set:
   a. periodically by a counter, counting the volume of data in the trace output stream and signalling when this count reaches a predetermined limit, at which point the counter also resets;
   b. on enabling of trace; and
   c. on the ETM logic being signalled that a processor change of mode has occurred.
4. When the ETM logic receives notification by signal (1) that a load and/or store operation is SP-relative, and the control bit in (2) is set, then:
   If the internal disable flag in (3) is set, it is cleared. (The address is traced normally.)
   Otherwise the ETM suppresses the generation of data address tracing.

Case (c) above is an example of a specific event as described above, required on the ARM architecture because of banking of the stack pointer. However, this may be omitted with the cost that the trace analyser may not be able to reconstruct all addresses in the cases:
the trace analyser does not know the mode of the processor, for example at the start of trace, or following an exception or return from exception, and so cannot associate a reconstructed stack pointer with the code; or
insufficient code is executed in the mode for one of the other devices that exposes the value of the state to have an effect.

The trace analyser in such an embodiment consists of:
The tracked register value is the stack pointer. The trace analyser needs a valid flag.
The trace analyser clears the valid flag as described at step (4) when it detects a discontinuity in the trace stream (that is, the start of tracing) or an indication of a mode change in the trace stream. These are two of the specific events that cause the internal disable flag in the ETM to become set. The counter event does not need to be detected, since the tracked register value in the trace analyser does not in fact become invalid at such an event, and in any case doing so would be impractical.
The values omitted from the trace that are recreated by step (2.b) are the stack addresses. These are usually generated by instructions of the form LDR/STR Rd,[SP, #imm] and PUSH/POP. From the opcode the trace analyser can determine the address to place into the output trace stream.
The operations that update the stack pointer (step (3)) are: ADD, SUB and write-back addressing modes for LDR/STR/PUSH/POP. These can be emulated, and can also be reversed in the manner described for the sub-process (2.a.iv).

From the above description of embodiments of the present invention, it will be appreciated that such embodiments enable a significant reduction in the amount of data that needs to be traced when full data address/data value tracing is enabled. To implement embodiments of the present invention, there is some cost associated in terms of additional gates within the on-chip trace module, but this additional cost is likely to be outweighed by the benefit in terms of increasing the effectiveness of any on-chip trace buffer, since the on-chip buffer may be reduced in size as a consequence, giving a net saving in area. Additionally, the bandwidth required between the on-chip trace module and any off-chip trace buffer is reduced.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:
1. A data processing apparatus comprising:
a device operable to perform a sequence of operations including memory operations on data values having associated data addresses, for at least some of the memory operations the data address being determined relative to an architectural state value of an item of architectural state of the device; and
trace logic operable to receive indications of the sequence of operations being performed by the device, and to generate from said indications a stream of trace elements;
when for a memory operation the data address is determined to have been determined relative to an architectural state value of said item of architectural state, the trace logic being operable dependent on that item of architectural state to omit at least one of a data address indication and a data value indication from the stream of trace elements generated in respect of that memory operation, wherein:
the trace logic is operable to reference an enable field associated with said item of architectural state, the enable field being settable by a user to an enable state or a disable state; and
when for a memory operation the data address is determined to have been determined relative to an architectural state value of said item of architectural state, the trace logic is operable dependent on that item of architectural state and the state of the enable field to determine whether to omit at least one of the data address indication and data value indication from the stream of trace elements.

2. A data processing apparatus as claimed in claim 1, wherein the trace logic has a disable flag which, on occurrence of one or more predetermined conditions, is set by the trace logic to temporarily disable omission of said at least one of the data address indication and data value indication from the stream of trace elements.

3. A data processing apparatus as claimed in claim 2, wherein said predetermined conditions comprise at least one of:
the output of a predetermined volume of trace elements;
the enabling of the trace logic to generate the stream of trace elements;
one or more predetermined events signalled by the device.

4. A data processing apparatus as claimed in claim 1, wherein:
when for a memory operation the data address has been determined relative to an architectural state value of said item of architectural state, the device is operable to provide the trace logic with an indication of that item of architectural state.

5. A data processing apparatus as claimed in claim 1, wherein said item of architectural state is a program counter (PC) used by the device, and when for a memory operation the data address is determined to have been determined relative to a value of the program counter, the trace logic is operable to omit the data address indication and the data value indication from the stream of trace elements.

6. A data processing apparatus as claimed in claim 5, wherein:
the trace logic is operable to reference an enable field associated with the program counter, the enable field being settable by a user to an enable state or a disable state; and
when for a memory operation the data address is determined to have been determined relative to a value of the program counter, the trace logic is operable if the enable state is set to omit the data address indication and the data value indication from the stream of trace elements, and is operable if the disable state is set to omit only the data address indication from the stream of trace elements.

7. A data processing apparatus as claimed in claim 1, wherein said item of architectural state is a stack pointer (SP) used by the device, and when for a memory operation the data address is determined to have been determined relative to a value of the stack pointer, the trace logic is operable to omit the data address indication from the stream of trace elements.

8. A data processing apparatus as claimed in claim 7, wherein:
the trace logic is operable to reference an enable field associated with the stack pointer, the enable field being settable by a user to an enable state or a disable state; and
when for a memory operation the data address is determined to have been determined relative to a value of the stack pointer, the trace logic is operable if the enable state is set to omit the data address indication from the stream of trace elements, and is operable if the disable state is set to include the data address indication in the stream of trace elements.

9. A data processing apparatus as claimed in claim 7, wherein the trace logic has a disable flag which, on occurrence of one or more predetermined conditions, is set by the trace logic to temporarily disable omission of said data address indication from the stream of trace elements.

10. A data processing apparatus as claimed in claim 9, wherein there are multiple stack pointers available to the device, at any point in time only one stack pointer being used by the device, the trace logic having one or more disable flags associated with the multiple stack pointers, where the number of disable flags is less than the number of stack pointers.

11. A data processing apparatus as claimed in claim 10, wherein one of said one or more predetermined conditions is a change of mode of operation of the device.

12. A data processing apparatus as claimed in claim 1, further comprising:
a buffer operable to store the stream of trace elements for subsequent reference by a trace analysing tool.

13. A data processing apparatus as claimed in claim 1, wherein for said item of architectural state there are multiple instances of that item of architectural state available to the device, at any point in time only one instance being used by the device, the trace logic having one or more disable flags associated with the multiple instances, where the number of disable flags is less than the number of instances.

14. A trace analysing apparatus for analysing a stream of trace elements generated by a data processing apparatus as claimed in claim 1, comprising:
a storage element for storing a tracked architectural state value of said item of architectural state;
a trace expander operable to receive the stream of trace elements generated by the data processing apparatus and to produce a modified stream of trace elements containing at least one data address indication or data value indication omitted from the stream of trace elements by:
identifying a trace element within the stream indicating a memory operation where the data address is determined relative to an architectural state value of said item of architectural state and where at least one of the associated data address indication and associated data value indication have been omitted from the stream of trace elements; and
generating the at least one data address indication or data value indication omitted from the stream of trace elements with reference to the tracked architectural state value.

15. A trace analysing apparatus as claimed in claim 14, wherein:
said item of architectural state is a program counter, and the tracked architectural state value is a tracked program counter value;
the trace expander is operable on identifying a trace element within the stream indicating a memory operation where the data address has been determined relative to a value of the program counter:
to generate a data address indication with reference to the tracked program counter value; and
to include that data address indication in the modified stream of trace elements.

16. A trace analysing apparatus as claimed in claim 15, wherein if for said memory operation the data value indication has been omitted from the stream of trace elements, the trace expander is further operable:
to generate the data value indication with reference to the generated data address indication and a copy of a program image of a program specifying said sequence of operations performed by said device.

17. A trace analysing apparatus as claimed in claim 14, wherein:
said item of architectural state is a stack pointer, and the tracked architectural state value is a tracked stack pointer value;
the trace expander is operable on identifying a trace element within the stream indicating a memory operation where the data address has been determined relative to a value of the stack pointer and the associated data address indication has been omitted from the stream of trace elements:
  to generate a data address indication with reference to the tracked stack pointer value; and
  to include that data address indication in the modified stream of trace elements.

18. A data processing apparatus comprising:
a device operable to perform a sequence of operations including memory operations on data values having associated data addresses, for at least some of the memory operations the data address being determined relative to an architectural state value of an item of architectural state of the device; and
trace logic operable to receive indications of the sequence of operations being performed by the device, and to generate from said indications a stream of trace elements;
when for a memory operation the data address is determined to have been determined relative to an architectural state value of said item of architectural state, the trace logic being operable dependent on that item of architectural state to omit at least one of a data address indication and a data value indication from the stream of trace elements generated in respect of that memory operation, wherein the trace logic has a disable flag which, on occurrence of one or mote predetermined conditions, is set by the trace logic to temporarily disable omission of said at least one of the data address indication and data value indication from the stream of trace elements.

19. A data processing apparatus as claimed in claim 18, wherein said predetermined conditions comprise at least one of:
  the output of a predetermined volume of trace elements;
  the enabling of the trace logic to generate the stream of trace elements;
  one or more predetermined events signalled by the device.

20. A data processing apparatus comprising:
a device operable to perform a sequence of operations including memory operations on data values having associated data addresses, for at least some of the memory operations the data address being determined relative to an architectural state value of an item of architectural state of the device; and
trace logic operable to receive indications of the sequence of operations being performed by the device, and to generate from said indications a stream of trace elements;
when for a memory operation the data address is determined to have been determined relative to an architectural state value of said item of architectural state, the trace logic being operable dependent on that item of architectural state to omit at least one of a data address indication and a data value indication from the stream of trace elements generated in respect of that memory operation, wherein said item of architectural state is a program counter (PC) used by the device, and when for a memory operation the data address is determined to have been determined relative to a value of the program counter, the trace logic is operable to omit the data address indication and the data value indication from the stream of trace elements, wherein:
the trace logic is operable to reference an enable field associated with the program counter, the enable field being settable by a user to an enable state or a disable state; and
when for a memory operation the data address is determined to have been determined relative to a value of the program counter, the trace logic is operable if the enable state is set to omit the data address indication and the data value indication from the stream of trace elements, and is operable if the disable state is set to omit only the data address indication from the stream of trace elements.

21. A data processing apparatus comprising:
a device operable to perform a sequence of operations including memory operations on data values having associated data addresses, for at least some of the memory operations the data address being determined relative to an architectural state value of an item of architectural state of the device; and
trace logic operable to receive indications of the sequence of operations being performed by the device, and to generate from said indications a stream of trace elements;
when for a memory operation the data address is detennined to have been determined relative to an architectural state value of said item of architectural state, the trace logic being operable dependent on that item of architectural state to omit at least one of a data address indication and a data value indication from the stream of trace elements generated in respect of that memory operation, wherein said item of architectural state is a stack pointer (SP) used by the device, and when for a memory operation the data address is determined to have been determined relative to a value of the stack pointer, the trace logic is operable to omit the data address indication from the stream of trace elements.

22. A data processing apparatus as claimed in claim 21, wherein:
the trace logic is operable to reference an enable field associated wit the stack pointer, the enable field being settable by a user to an enable state or a disable state; and
when for a memory operation the data address is determined to have been determined relative to a value of the stack pointer, the trace logic is operable if the enable state is set to omit the data address indication from the stream of trace elements, and is operable if the disable state is set to include the data address indication in the stream of trace elements.

23. A data processing apparatus as claimed in claim 21, wherein the trace logic has a disable flag which, on occurrence of one or more predetermined conditions, is set by the trace logic to temporarily disable omission of said data address indication from the stream of trace elements.

24. A data processing apparatus as claimed in claim 23, wherein there are multiple stack pointers available to the device, at any point in time only one stack pointer being used by the device, the trace logic having one or more disable flags associated with the multiple stack pointers, where the number of disable flags is less than the number of stack pointers.

25. A data processing apparatus as claimed in claim 24, wherein one of said one or more predetermined conditions is a change of mode of operation of the device.

26. A data processing apparatus comprising:
a device operable to perform a sequence of operations including memory operations on data values having associated data addresses, for at least some of the memory operations the data address being determined relative to an architectural state value of an item of architectural state of the device; and trace logic operable to receive indications of the sequence of operations being performed by the device, and to generate from said indications a stream of trace elements;

when for a memory operation the data address is determined to have been determined relative to an architectural state value of said item of architectural state, the trace logic being operable dependent on that item of architectural state to omit at least one of a data address indication and a data value indication from the stream of trace elements generated in respect of that memory operation, wherein for said item of architectural state there are multiple instances of that item of architectural state available to the device, at any point in time only one instance being used by the device, the trace logic having one or more disable flags associated with the multiple instances, where the number of disable flags is less than the number of instances.

27. A trace analysing apparatus for analysing a stream of trace elements generated by a data processing apparatus comprising:

a device operable to perform a sequence of operations including memory operations on data values having associated data addresses, for at least some of the memory operations the data address being determined relative to an architectural state value of an item of architectural state of the device; and trace logic operable to receive indications of the sequence of operations being performed by the device, and to generate from said indications a stream of trace elements;

when for a memory operation the data address is determined to have been determined relative to an architectural state value of said item of architectural state, the trace logic being operable dependent on that item of architectural state to omit at least one of a data address indication and a data value indication from the stream of trace elements generated in respect of that memory operation, said trace analysing apparatus comprising:

a storage element for storing a tracked architectural state value of said item of architectural state;

a trace expander operable to receive the stream of trace elements generated by the data processing apparatus and to produce a modified stream of trace elements containing at least one data address indication or data value indication omitted from the stream of trace elements by:

identifying a trace element within the stream indicating a memory operation where the data address is determined relative to an architectural state value of said item of architectural state and where at least one of the associated data address indication and associated data value indication have been omitted from the stream of trace elements; and generating the at least one data address indication or data value indication omitted from the stream of trace elements with reference to the tracked architectural state value, wherein:

said item of architectural state is a stack pointer, and the tracked architectural state value is a tracked stack pointer value;

the trace expander is operable on identifying a trace element within the stream indicating a memory operation where the data address has been determined relative to a value of the stack pointer and the associated data address indication has been omitted from the stream of trace elements:

to generate a data address indication with reference to the tracked stack pointer value; and to include that data address indication in the modified stream of trace elements.

* * * * *